US010031369B2

(12) United States Patent
Wang

(10) Patent No.: US 10,031,369 B2
(45) Date of Patent: Jul. 24, 2018

(54) TRANSPARENT DISPLAY DEVICE

(71) Applicant: BOE Technology Group Co., Ltd., Beijing (CN)

(72) Inventor: Shang Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 14/500,597

(22) Filed: Sep. 29, 2014

(65) Prior Publication Data
US 2015/0369452 A1 Dec. 24, 2015

(30) Foreign Application Priority Data

Jun. 23, 2014 (CN) .......................... 2014 1 0284018

(51) Int. Cl.
G02F 1/335 (2006.01)
G02F 1/13357 (2006.01)
G02F 1/1335 (2006.01)

(52) U.S. Cl.
CPC ...... *G02F 1/1336* (2013.01); *G02F 1/133553* (2013.01)

(58) Field of Classification Search
CPC ................ F21V 7/0083; G02F 1/1336; G02F 1/133553; G06T 19/006; G09G 2356/00; G09G 2340/0464; G09G 2354/00
See application file for complete search history.

(56) References Cited

U.S. PATENT DOCUMENTS

| 5,396,350 | A | * | 3/1995 | Beeson | F21V 5/02 349/62 |
| 6,373,629 | B1 | * | 4/2002 | Yamagishi | G02B 27/283 348/E5.141 |
| 2002/0080598 | A1 | * | 6/2002 | Parker | G02B 6/0021 362/616 |
| 2002/0154510 | A1 | * | 10/2002 | Li | G02B 6/0006 362/458 |

(Continued)

FOREIGN PATENT DOCUMENTS

CN 1629700 6/2005
CN 201021964 2/2008

(Continued)

OTHER PUBLICATIONS

Office action from Chinese Application No. 201410284018.9 dated Apr. 1, 2016.

(Continued)

*Primary Examiner* — Andrew Coughlin
*Assistant Examiner* — Fatima Farokhrooz
(74) *Attorney, Agent, or Firm* — Calfee, Halter & Griswold LLP

(57) ABSTRACT

The general inventive concepts provide a transparent display device comprising at least one display panel, the transparent display device further comprises a backlight light source and at least one double-sided reflector array located at the backlight side of the display panel. The double-sided reflector array comprises a plurality of double-sided reflectors arranged aslant relative to the display panel. The backlight light source is located at one side of the double-sided reflector array, and is capable of providing light beams to the double-sided reflector array.

17 Claims, 5 Drawing Sheets

(56) References Cited

U.S. PATENT DOCUMENTS

| | | | |
|---|---|---|---|
| 2008/0068858 A1* | 3/2008 | Yamamoto | G02B 6/0033 362/606 |
| 2008/0157114 A1* | 7/2008 | Basin | H01L 24/97 257/98 |
| 2008/0247150 A1* | 10/2008 | Itoh | G02B 6/0028 362/19 |
| 2012/0105751 A1* | 5/2012 | Mao | G02F 1/133553 349/33 |
| 2012/0218611 A1* | 8/2012 | Ikari | G01N 21/8901 358/474 |

FOREIGN PATENT DOCUMENTS

| | | |
|---|---|---|
| CN | 102279465 | 12/2011 |
| CN | 103293747 | 9/2013 |
| JP | H08234182 | 9/1996 |

OTHER PUBLICATIONS

Office Action from China Application No. 201410284018.9 dated Dec. 9, 2016.

\* cited by examiner

TRANSPARENT DISPLAY DEVICE

RELATED APPLICATIONS

The present application claims the benefit of Chinese Patent Application No. 201410284018.9, filed Jun. 23, 2014, the entire disclosure of which is incorporated herein by reference.

FIELD

This disclosure relates to the field of display technology, and specifically to a transparent display device.

BACKGROUND

In recent years, transparent display devices have become a popular point of research and development due to its advantages including the unique visual effect, light weight and thin profile, ease of transport, support of 3D display technology, low energy consumption, energy saving, etc. As one of the most critical components of a liquid crystal display device, a backlight module supplies a display panel with light having sufficient luminance and uniform distribution so as to enable it to display images normally. Therefore, the transparent design of the backlight module is an important problem in the transparent liquid crystal display devices.

In the prior art, the transmissivity of the backlight module is generally improved by adding additional optical devices, however, this is limited by the design of the original backlight module. Thus, not only is the effect of transmissivity limited, but also the functions of the original display panel are influenced to some extent, which brings a series of defects in display effects.

SUMMARY

An object of this disclosure is to provide a transparent display device in order to at least partly overcome the above mentioned problems.

According to an exemplary embodiment, a transparent display device is provided, comprising a display panel, wherein the transparent display device further comprises at least one backlight light source and at least one double-sided reflector array located on a backlight side of the display panel. The double-sided reflector array comprises a plurality of double-sided reflectors arranged aslant relative to the plane of the display panel. Each of the double-sided reflectors comprises a first side facing the display panel and a second side facing away from the display panel. The backlight light source is located at one side of the double-sided reflector array, and is capable of providing light beams to the double-sided reflector array. Each of the double-sided reflectors is arranged such that: a part of the light beams are incident on the display panel after being reflected by the first side of the double-sided reflector; and a light beam incident from the backlight side of the display panel is incident on the display panel after being reflected by the second side of the double-sided reflector and the first side of an adjacent double-sided reflector successively.

According to an exemplary embodiment, the backlight light source is a collimated light source providing substantially parallel collimated light beams propagated along a predetermined direction.

According to an exemplary embodiment, the plurality of double-sided reflectors are substantially parallel to one another.

According to an exemplary embodiment, the collimated light source comprises one or more light emitting units arranged along a direction perpendicular to a plane where the display panel displays; each of the one or more light emitting units comprises a light source and a collimator arranged on the light source, each of the one or more light emitting units being used for providing a part of the parallel collimated light beams propagated along the predetermined direction to the double-sided reflector array.

According to an exemplary embodiment, the collimator comprises an inner side wall, an inner side top surface and an outer side wall, the inner side top surface joined to the inner side wall, the inner side top surface and the outer side wall being both free-form surfaces.

According to an exemplary embodiment, the collimated light source further comprises a uniform light plate located between the one or more light emitting units and the double-sided reflector array. The uniform light plate enables the light intensity of the parallel collimated light beams on a plane perpendicular to the propagating direction to be uniformly distributed.

According to an exemplary embodiment, the collimated light source further comprises a support structure on which the light emitting units are fixed.

According to an exemplary embodiment, the included angle between the collimated light-exiting direction of each of the light emitting units and the plane where the display panel displays is equal.

According to an exemplary embodiment, the support structure is made of a material which is capable of heat dissipation (i.e., it serves a heat-dissipative function).

According to an exemplary embodiment, the material is aluminum.

According to an exemplary embodiment, the light emitting unit comprises a light emitting diode (LED), a laser diode (LD) or a metal halide lamp.

According to an exemplary embodiment, in the double-sided reflector array, the spacing between adjacent mirror surface double-sided reflectors is equal.

According to an spacing between embodiment, the slant angle formed by the mirror surface of the double-sided reflector facing the display panel and the plane where the display panel locates is 45°.

According to an exemplary embodiment, the double-sided reflector comprises a first transparent support layer, a double reflective layer and a second transparent support layer laminated successively; wherein the double reflective layer is capable of reflecting visible light incident from either side of the double reflective layer.

According to an exemplary embodiment, the double reflective layer is a silver coating layer.

According to an exemplary embodiment, the display panel is attached with a backlight module consisting of the collimated light source and the double-sided reflector array through a transparent attachment structure; the double-sided reflector array of the backlight module is fixed through the transparent attachment structure, such that the slant angle formed by the mirror surface of a double-sided reflector facing the display panel and the plane where the display panel displays is equal.

According to an exemplary embodiment, the transparent display device comprises two double-sided reflector arrays: a first double-sided reflector array and a second double-sided reflector array, and two collimated light sources: a first collimated light source and a second collimated light source. The first collimated light source provides parallel collimated light beams to the first double-sided reflector array, the second collimated light source provides parallel collimated light beams to the second double-sided reflector array. Also, the first double-sided reflector array and the second double-sided reflector array can be symmetrical with respect to a normal longitudinal section that divides the display panel equally.

The double-sided reflector array can on the one hand make the collimated parallel light beams provided by the collimated light source incident on the display panel after being reflected so as to provide back lighting, and can on the other hand make the ambient light from the backlight side of the display panel incident on the display panel after being reflected twice, which corresponds to transmission through the backlight module, thereby producing transparent display effect. The double-sided reflector array simultaneously enables the functions of back lighting and transmitting through the ambient light at the backlight side.

BRIEF DESCRIPTION OF THE DRAWINGS

Several technical aspects of the present disclosure will be described in more detail below with reference to the accompanying drawings in order for those skilled in the art to be able to carry out the embodiments of present disclosure. The present disclosure may, however, be embodied in many different forms and should not be construed as limited to the exemplary embodiments set forth herein. In particular, the general inventive concepts are not intended to be limited by the various illustrative embodiments disclosed herein.

DETAILED DESCRIPTION

Various embodiments will be further described in detail in conjunction with the drawings. The embodiments described herein are provided merely for illustration and are not intended to limit the scope of the claims. Those of skill in the art will recognize that various other modifications and combinations are possible and still fall within the scope of the general inventive concepts.

As used herein, the term "transparent display" refers to a display with organized and substantially parallel light incident on the display. The term also refers to minimizing undesirable light from the backside of the display.

Figure 1:
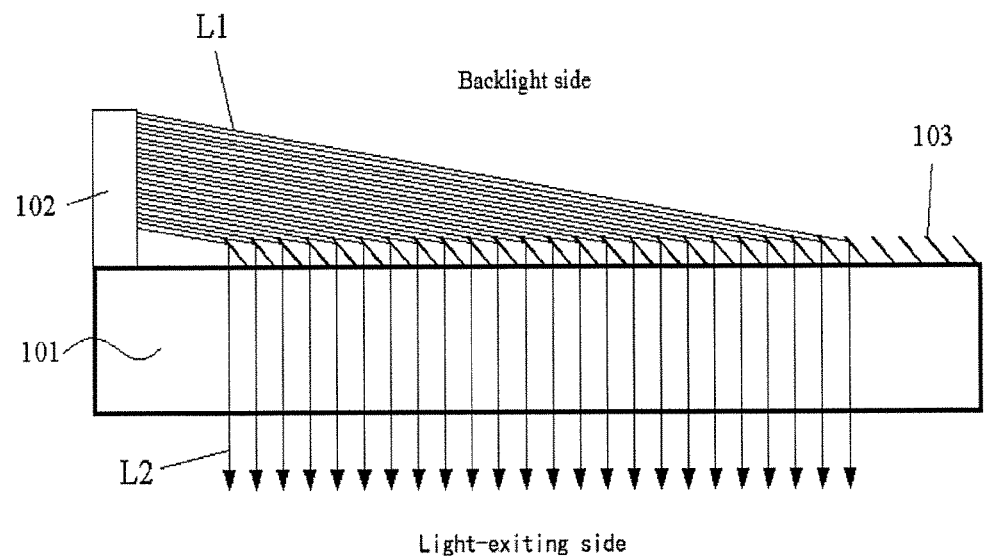
FIG. 1 illustrates a side view of a transparent display device according to an exemplary embodiment, and a light path diagram when it provides back lighting.

FIG. 1 illustrates a transparent display device according to an embodiment of this disclosure, which comprises a display panel 101, a collimated light source 102, and a double-sided reflector array 103 located at the backlight side of the display panel 101.

The double-sided reflector array 103 comprises a plurality of mutually parallel double-sided reflectors arranged aslant relative to the display panel. Each of the double-sided reflectors comprises a first side facing the display panel and a second side facing away from the display panel.

The collimated light source 102 is located at one side of the double-sided reflector array 103, and is capable of providing parallel collimated light beams L1 propagated along a predetermined direction to the double-sided reflector array 103.

Figure 2:
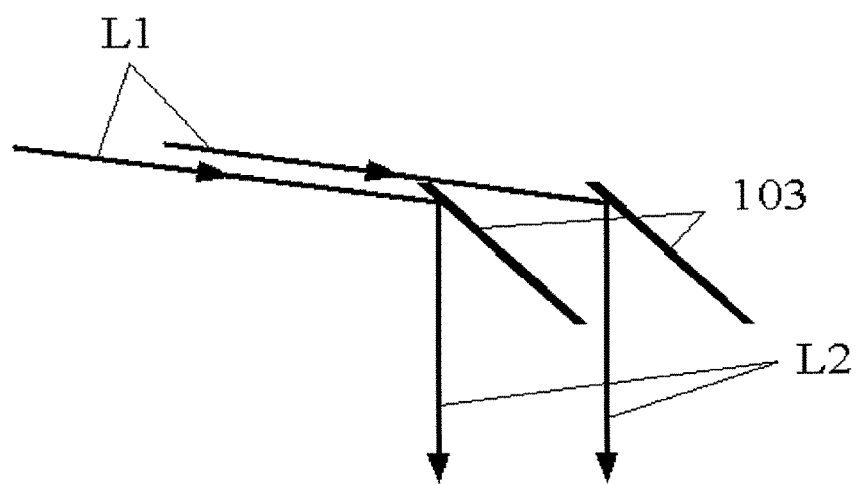
FIG. 2 is a light path diagram at the double-sided reflectors when the transparent display device according to an exemplary embodiment provides back lighting.

As shown in FIG. 1 and FIG. 2, each of the double-sided reflectors is arranged such that a part of the parallel collimated light beams L1 are incident on the display panel 101 (the incident light beams are L2) after being reflected by the first side (the left side, the second side thereof is the right side as shown in FIGS. 1 and 2) of the double-sided reflector.

Figure 3:
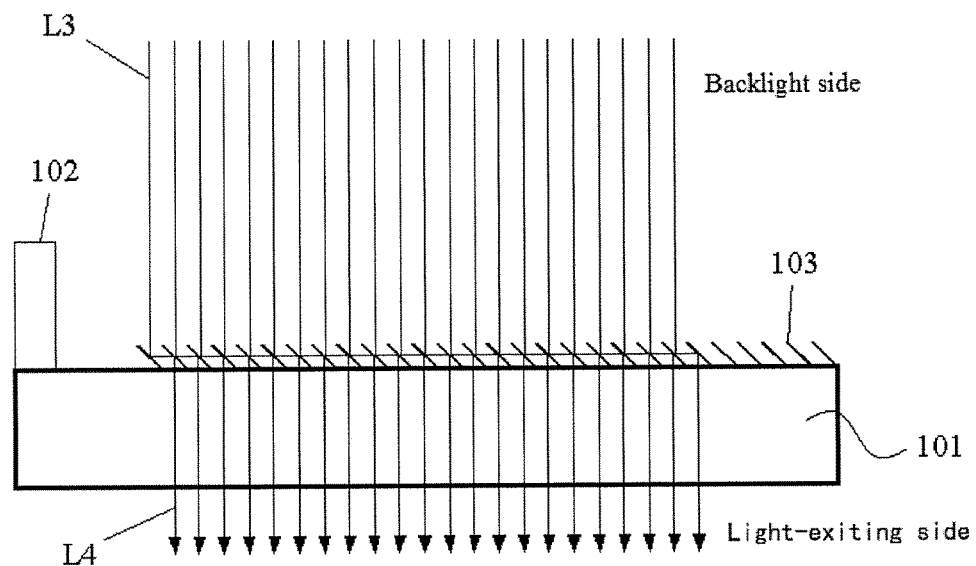
FIG. 3 is a light path diagram when the transparent display device according to an exemplary embodiment achieves transparent display.
Figure 4:
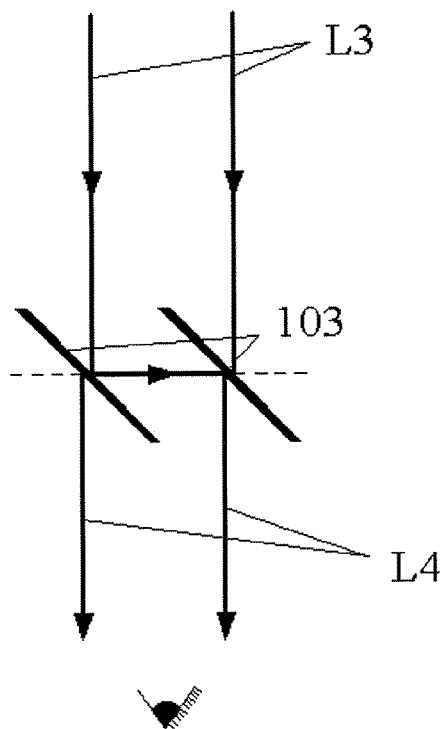
FIG. 4 is a light path diagram of double-sided reflectors when the transparent display device according to an exemplary embodiment achieves transparent display.

As shown in FIG. 3 and FIG. 4, each of the double-sided reflectors is arranged such that light beams L3 incident from the backlight side of the display panel are incident on the display panel 101 (the incident light beams are L4) after being reflected by the second side of the double-sided reflector and the first side of an adjacent double-sided reflector successively.

Based on the above features, it is clear that: in order to realize the light path as shown in FIG. 1, the exiting position of the light from the collimated light source 102 needs to be higher than the top of the double-sided reflector array 103; moreover, if the exiting light beams L2 are to be perpendicular to a plane where the display panel 101 displays, both a predetermined direction in which the parallel collimated light beams L1 are propagated and a slant angle formed by the mirror surface of the double-sided reflector facing the display panel and the plane where the display panel 101 locates need to be set according to the light's reflection law.

It can be seen that the first side of the double-sided reflector is the side where the collimated light source 102 providing the parallel collimated light beams L1 locates, the other side is namely the second side of the double-sided reflector.

The embodiments of this disclosure utilize mutual cooperation of the double-sided reflectors to realize relative transparency of the display. Meanwhile, when the collimated light source emits light, the parallel collimated light beams L1 can be utilized to provide the back lighting.

As a whole, the exiting light beams L2 are generally mutually parallel with one another and perpendicular to the plane where the display panel 101 displays, such that the backlight module consisting of the collimated light source and the double-sided reflector array provides the back lighting to the display panel 101.

FIG. 3 and FIG. 4 illustrate a light path when a transparent display device according to an exemplary embodiment realizes transparency of the display, the ambient light L3 is reflected onto an adjacent reflector when passing through the double-sided reflector, and finally incident on the display panel 101 from the backlight side of the display panel 101, thereby forming transparent display. A viewer will see the scenery at its backlight side when standing at the light-exiting side of the display panel 101, the light of the scenery is thereby conveyed to the viewer's eyes after two total reflections.

Therefore, the double-sided reflector array can, on the one hand, make the collimated parallel light beams provided by the collimated light source incident on the display panel 101 after being reflected so as to provide back lighting, and can on the other hand make the ambient light from the backlight side of the display panel 101 incident on the display panel 101 after being reflected twice, which corresponds to transmission through the backlight module. Thereby a transparent display effect is provided, i.e., transmitting back lighting and ambient light on the backlight side simultaneously.

It can be seen that a main function of the collimated light source 102 is to provide parallel collimated light beams L1, while a main function of the double-sided reflector array 103 is to reflect the light from the first side and the second side.

Figure 5:
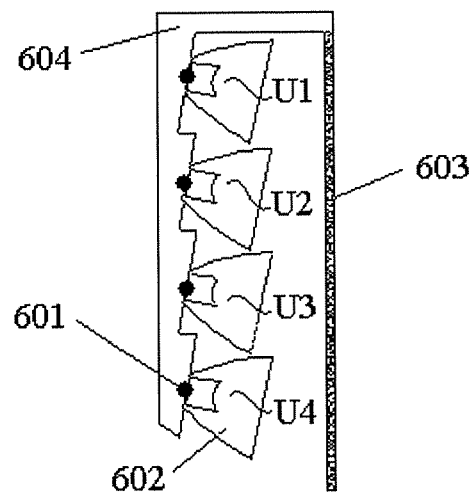
FIG. 5 is a structural diagram of a collimated light source suitable for use in the transparent display device according to an exemplary embodiment.

FIG. 5 is a structural diagram of a collimated light source suitable for use in a transparent display device according to an exemplary embodiment. The collimated light source comprises one or more light emitting units (in the figure, represented by U1, U2, U3, U4 . . . ) arranged along a direction perpendicular to the plane where the display panel 101 locates. Each of the one or more light emitting units comprises a light source 601 and a collimator 602 arranged on the light source 601. Each of the one or more light emitting units is used for providing a part of the parallel collimated light beams L1 propagated along a predetermined direction to the double-sided reflector array 103. It can be seen that the light emitted by the light source 601 becomes collimated light beams after being collimated by the collimator. Light emitting units are perpendicularly arranged to emit the collimated light beams, i.e., the parallel collimated light beams L1, are arranged at the same angle relative to one another.

Figure 6:
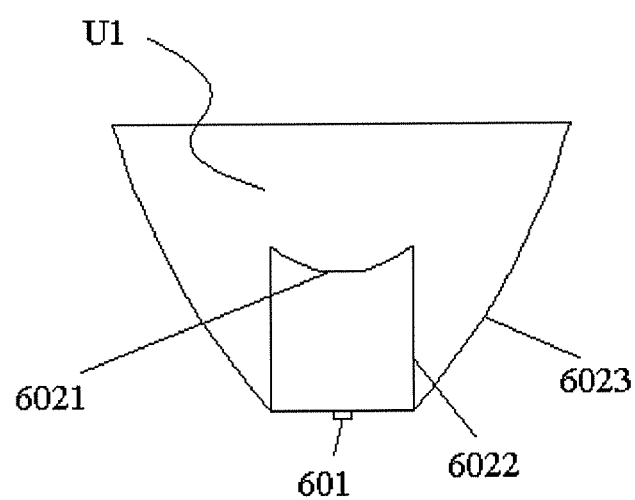
FIG. 6 is a structural diagram of each light emitting unit in the collimated light source suitable for use in the transparent display device according to an exemplary embodiment.

FIG. 6 is a structural diagram of each light emitting unit in the collimated light source suitable for use in a transparent display device according to an exemplary embodiment. The collimator 602 comprises an inner side top surface 6021, an inner side wall 6022, and an outer side wall 6023. The inner side top surface 6021 is jointed with the inner side wall 6022, the inner side top surface 6021 and the outer side wall 6023 are both free-form surfaces. Such a design can collimate the light emitted by the light source 601 effectively.

Further, the collimated light source further comprises an uniform light plate 603 located between the light emitting unit and the double-sided reflector array 103 for enabling the light intensity of the parallel collimated light beams L1 on a plane perpendicular to the propagating direction to be uniformly distributed. The uniform light plate 603 uses a surface scattering or internal particle scattering structure, such that the light emitted by the array of scattering light sources 601 enables uniform illumination of the area of the double-sided reflector array 103.

The collimated light source further comprises a support structure 604 on which the one or more light emitting units are fixed such that the included angle between the light-exiting direction of each of the one or more light emitting units and the plane where the display panel 101 locates is equal. That is, the one or more light emitting units are fixed by the support structure 604 such that the one or more light emitting units are enabled to emit the collimated light beams at the same angle as mentioned above. The support structure is made of a material with heat dissipation capacity. Generally speaking, the support structure can provide support for the light emitting units effectively, and at the same time provide heat dissipation to the light source 601.

Further, the light emitting unit comprises a light emitting diode (LED), a laser diode (LD) or a metal halide lamp, each of these are white light sources close to point light sources, and can produce satisfactory light when combined with the above structure.

As a whole, the collimated light source is formed by attaching a light source 601 on the support structure, mounting the collimator 602 around the light source 601. The uniform light plate 603 is mounted in front of the whole light source array, thereby enabling uniform illumination to the area of the double-sided reflector array 103.

Figure 7:
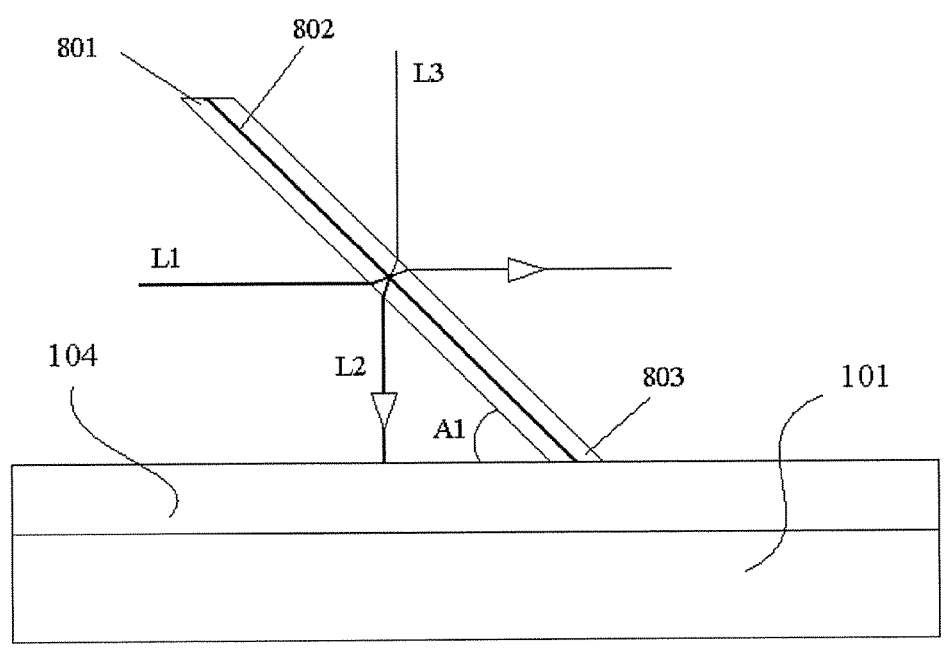
FIG. 7 is a structural diagram of a double-sided reflector suitable for use in the transparent display device according to an exemplary embodiment.

FIG. 7 is a structural diagram of a double-sided reflector suitable for use in a transparent display device according to an exemplary embodiment. The double-sided reflector comprises a first transparent support layer 801, a double reflective layer 802 and a second transparent support layer 803 laminated successively; the double reflective layer 802 is capable of reflecting visible light (such as L1 and L3) incident from either side. As for the double reflective layer 802, it can be generally formed of a metal coating or other materials, and its function of double-sided reflection can be achieved as long as the reflectivity of the visible light incident from two sides is larger. The double reflective layer 802 can be a silver coating layer, i.e., taking silver as the material of the reflective coating, which has a very high reflectivity with respect to the visible light, and has good optical characteristics and physical and chemical stability.

Further, in the double-sided reflector array 103, the mirror surface spacing between every two adjacent double-sided reflectors is equal. Such a design can make L2 and L4 to be emitted uniformly, thereby producing a better visual effect.

Further, a slant angle A1 formed by the mirror surface of the double-sided reflector facing the display panel and the plane where the display panel 101 locates is 45°. Under this slant angle, it is beneficial to achieve two total reflections and make the exiting light beams L2 to be perpendicular to a plane where the display panel 101 locates. Under this slant angle, the ambient light can be transmitted through the double-sided reflector array 103 in accordance with the light path as shown in FIG. 4, without changing the propagating direction of the ambient light, however, it may have an appropriate transmission angle size and image shifting degree.

Further, the display panel 101 is attached with the backlight module through a transparent (i.e., virtually invisible to the viewer of the display) attachment structure 104; the double-sided reflector array 103 of the backlight module is fixed through the transparent attachment structure 104, such that the slant angle A1 formed by the mirror surface of the double-sided reflector facing the display panel and the plane where the display panel 101 locates is equal, enabling the double-sided reflectors to be parallel with one another. That is, the bottom of the double-sided reflectors in the backlight module is fixed through the transparent attachment structure 104 which is attached with the display panel 101 directly. Such a transparent attachment structure 104 can economically play the roles of both connecting and fixing functions, and of course, it may be a transparent solid formed on the display panel 101. In addition, a groove can be provided correspondingly at the contact position of the double-sided reflector on the display panel for the convenience of stable combination of the two.

Generally, in such a structure, when the parallel collimated light beams L1 emitted by the collimated light source 102 are incident from the side, the light will be reflected by the first side of the double-sided reflector so as to be emitted towards the display panel 101, thereby forming transparent display. When the ambient light L3 is incident from the backlight side of the display panel 101, the light is reflected to an adjacent double-sided reflector by the second side of the double-sided reflector, and finally reflected again by the first side of the adjacent double-sided reflector so as to be emitted towards the display panel 101 and transmitted into the human eyes.

Figure 8:
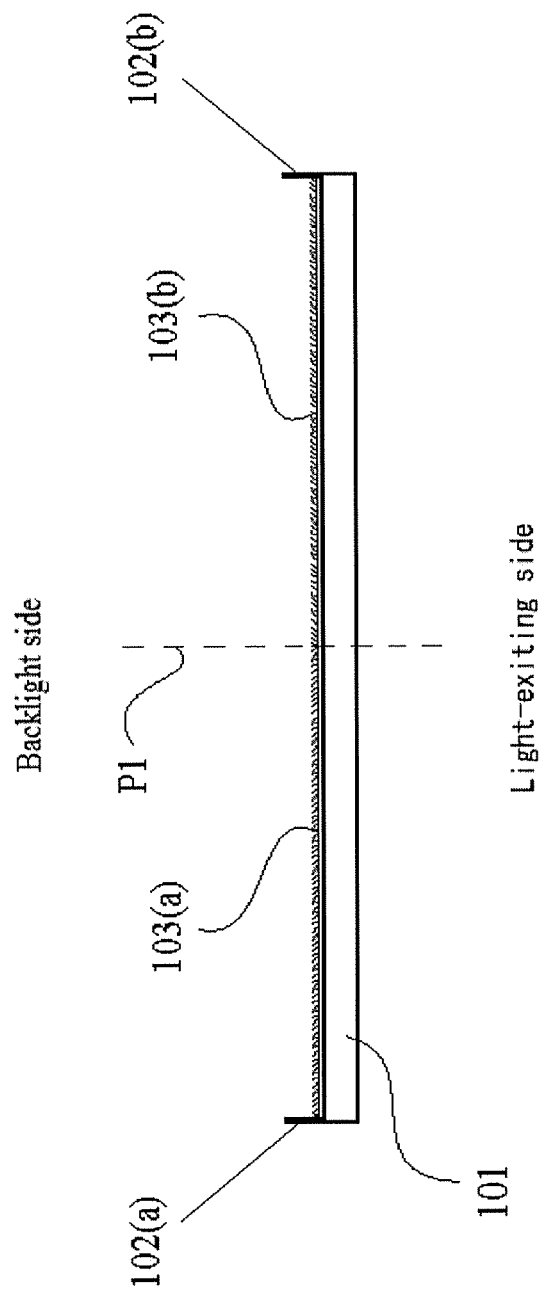
FIG. 8 is a side view of a transparent display device structure with two sets of double-sided reflector arrays and collimated light sources according to an exemplary embodiment.

Further, as shown in FIG. 8, the transparent display device comprises a first double-sided reflector array 103(a) and a first collimated light source 102(a) that provides parallel collimated light beams to the first double-sided reflector array 103(a), and a second double-sided reflector array 103(b) and a second collimated light source 102(b) that provides parallel collimated light beams to the second double-sided reflector array 103(b).

The first double-sided reflector array 103(a) and the second double-sided reflector array 103(b) are symmetrical with respect to a normal longitudinal section P1 that divides the display panel 101 equally, and the normal longitudinal section P1 is located at a side (here specifically the right side of the first double-sided reflector array 103(a), the left side of the second double-sided reflector array 103(b)) where the second side of any double-sided reflector locates. The structure can avoid the parallel collimated light beams that need to be provided by the collimated light source from being too wide, and avoid the height of the light source from being too high so as to influence the thickness of the whole device. Of course, a plurality of groups of collimated light sources and double-sided reflector arrays can be also arranged based on the same principle, so as to further reduce the scope to which each group needs to provide the back lighting.

The general inventive concepts provide a transparent display device, which mainly aims to implement the functions of back lighting and transmitting through the ambient light at the backlight side simultaneously by means of the arrangement of a double-sided reflector array.

Although the present disclosure has been described with reference to specific embodiments, it should be understood that the limitations of the described embodiments are provided merely for purpose of illustration and are not intended to limit the present invention and associated general inventive concepts. Instead, the scope of the present invention is defined by the appended claims, and all variations and equivalents that fall within the range of the claims are intended to be embraced therein. Thus, other embodiments than the specific exemplary ones described herein are equally possible within the scope of these appended claims.

The invention claimed is:

1. A transparent display device comprising a display panel, wherein the transparent display device further comprises at least one backlight light source and at least one double-sided reflector array located at the backlight side of the display panel;
    the double-sided reflector array comprises a plurality of double-sided reflectors arranged aslant relative to the display panel; each of the double-sided reflectors comprises a first side facing the display panel and a second side facing away from the display panel;
the backlight light source is located at one side of the double-sided reflector array, and is capable of providing light beams to the double-sided reflector array as backlight of the transparent display device;
    each of the double-sided reflectors is arranged such that:
        a part of the light beams provided by the backlight light source as backlight of the transparent display device are incident into the display panel after being reflected by the first side of the double-sided reflector; and an ambient light incident from the backlight side of the display panel and reflected by a scenery at the backlight side is incident into the display panel after being reflected by the second side of the double-sided reflector and the first side of an adjacent double-sided reflector successively so as to realize a transparent display of the scenery at the backlight side; and
    wherein the backlight light source is a collimated light source providing parallel collimated light beams propagated along a predetermined direction, and the exiting position of the light from the collimated light source is higher than the top of the double-sided reflector array.

2. The transparent display device according to claim 1, wherein the plurality of double-sided reflectors is parallel each other.

3. The transparent display device according to claim 1, wherein the collimated light source comprises one or more light emitting units arranged along a direction perpendicular to a plane where the display panel displays;
    each of the one or more emitting units comprises a light source and a collimator arranged on the light source, each of the one or more light emitting units being used for providing a part of the parallel collimated light beams propagated along the predetermined direction to the double-sided reflector array.

4. The transparent display device according to claim 1, wherein the display panel is attached with a backlight module consisting of the collimated light source and the double-sided reflector array through a transparent attachment structure; the double-sided reflector array of the backlight module is fixed through the transparent attachment structure.

5. The transparent display device according to claim 2, wherein in the double-sided reflector array, spacing between adjacent double-sided reflectors is equal.

6. The transparent display device according to claim 2, wherein an angle formed by the mirror surface of the double-sided reflector facing the display panel and the plane where the display panel displays is 45°.

7. The transparent display device according to claim 2, wherein the double-sided reflector comprises a first transparent support layer, a double reflective layer and a second transparent support layer laminated successively; wherein the double reflective layer is capable of reflecting visible light incident from either side of the double reflective layer.

8. The transparent display device according to claim 3, wherein the collimator comprises an inner side wall, an inner side top surface and an outer side wall, the inner side top surface joined with the inner side wall, the inner side top surface and the outer side wall being both free-form surfaces.

9. The transparent display device according to claim 3, wherein the collimated light source further comprises a uniform light plate located between the one or more light emitting units and the double-sided reflector array for enabling the light intensity of the parallel collimated light beams on a plane perpendicular to the propagating direction to be uniformly distributed.

10. The transparent display device according to claim 3, wherein the collimated light source further comprises a support structure on which the one or more light emitting units are fixed.

11. The transparent display device according to claim 3, wherein the light emitting unit comprises at least one of a light emitting diode (LED), a laser diode (LD), and a metal halide lamp.

12. The transparent display device according to claim 3, wherein the transparent display device comprises two double-sided reflector arrays: a first double-sided reflector array and a second double-sided reflector array, and two collimated light sources: a first collimated light source and a second collimated light source, the first collimated light source provides parallel collimated light beams to the first double-sided reflector array, the second collimated light source provides parallel collimated light beams to the second double-sided reflector array.

13. The transparent display device according to claim 10, wherein the included angle between the collimated light-exiting direction of each of the one or more light emitting units and the plane where the display panel locates is equal.

14. The transparent display device according to claim 10, wherein the support structure is made of a material capable of heat dissipation.

15. The transparent display device according to claim 14, wherein the material is aluminum.

16. The transparent display device according to claim 7, wherein the double reflective layer is a silver coating layer.

17. The transparent display device according to claim 12, wherein the first double-sided reflector array and the second double-sided reflector array are symmetrical with respect to a normal longitudinal section that divides the display panel equally.

* * * * *